May 16, 1950   A. B. PICKETT   2,507,542
REVETMENT MOLDING APPARATUS
Filed July 18, 1946   3 Sheets-Sheet 2
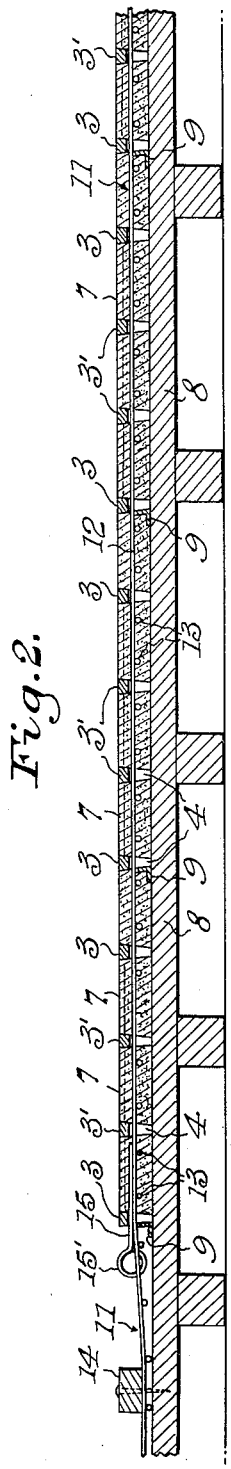
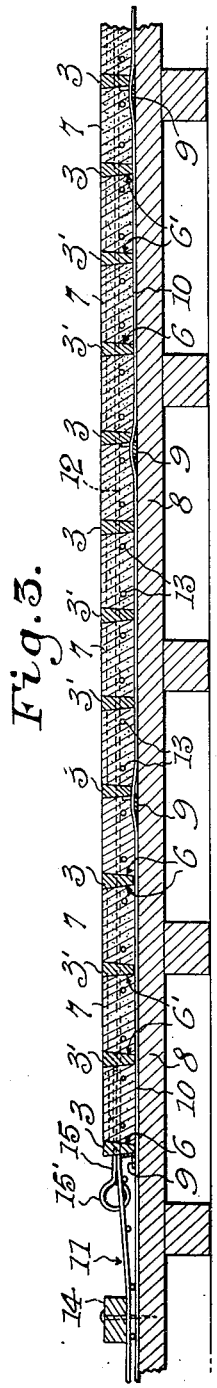
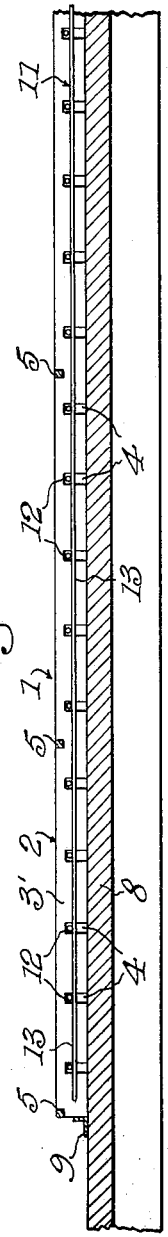
Inventor
Andrew B. Pickett
By
Attorneys May 16, 1950     A. B. PICKETT     2,507,542
REVETMENT MOLDING APPARATUS Filed July 18, 1946     3 Sheets-Sheet 3

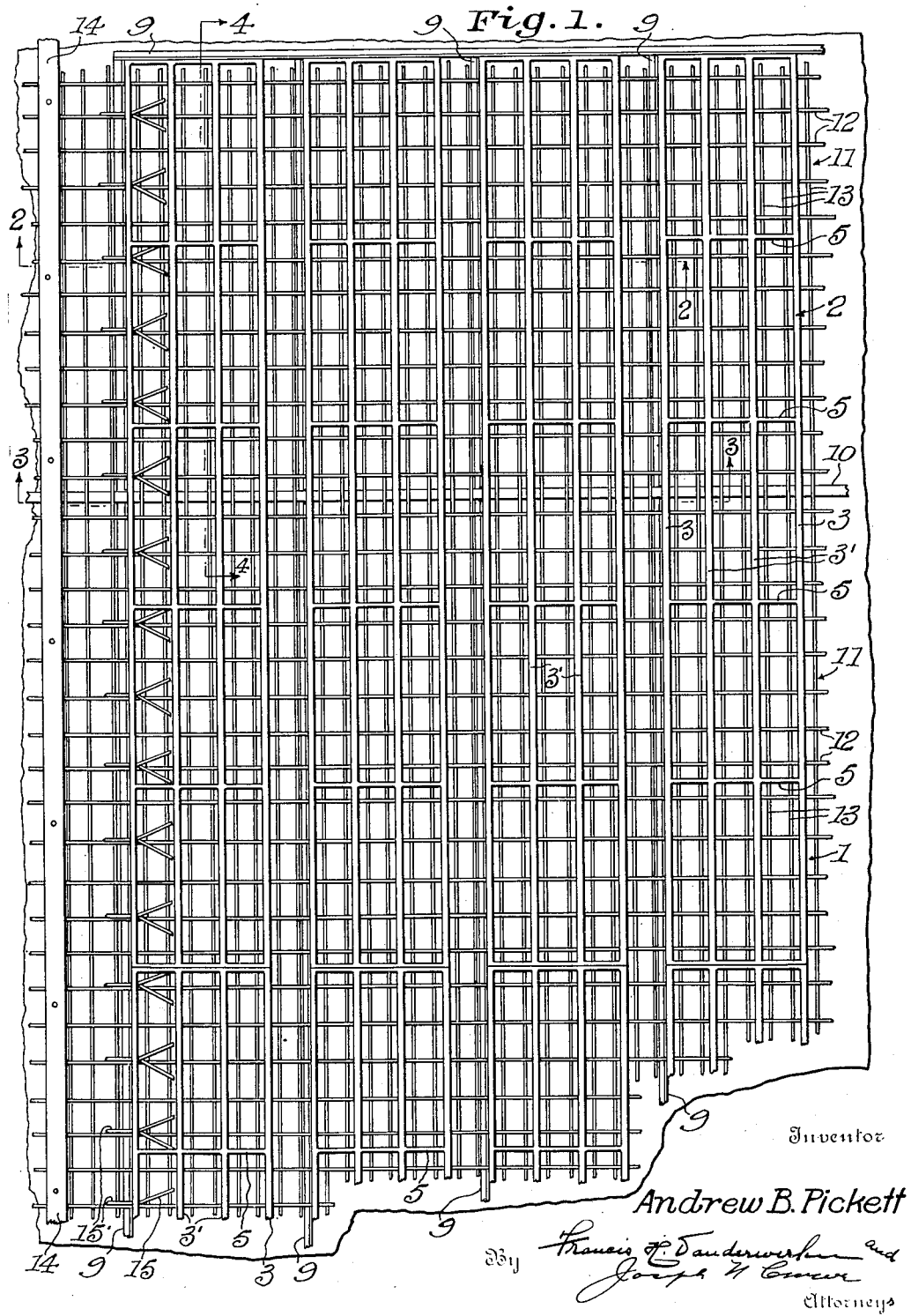

Inventor
Andrew B. Pickett

Patented May 16, 1950

2,507,542

UNITED STATES PATENT OFFICE 2,507,542

REVETMENT MOLDING APPARATUS

Andrew B. Pickett, United States Army

Application July 18, 1946, Serial No. 684,438

3 Claims. (Cl. 25—121)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a revetment molding apparatus and is particularly directed to a mold used in forming revetment mats for the protection of river banks and the like against erosion.

One of the objects of this invention is to provide a rectangularly shaped revetment mold including spaced longitudinal side and intermediate members having recesses formed in the bottoms thereof for receiving bonding wires of a reinforcing fabric, said side and intermediate members of the mold being integrally joined together at their upper portions by webs, with the faces of the side and intermediate members of the mold being beveled to cause reinforced concrete blocks adapted to be produced by the mold to have longitudinal opposite edges beveled or shaped in a manner such that the connected blocks may be wound up into a roll.

Another object of the invention is to provide a molding apparatus for forming revetment mats and including a support having guide members mounted thereon, a reinforcing fabric carried by the guide members and a plurality of molds including members having recesses formed in the bottoms thereof mounted on the support over the reinforcing fabric, and abutting against the guide members, said guide members serving to transversely space the molds on the support and holding a portion of the reinforcing fabric in the recesses on the members of the molds.

Another object of the invention is to provide a revetment molding apparatus in which reinforced block unit mat sections may be quickly produced and easily rolled up and removed when a unit mat section of blocks has sufficiently cured.

Another object of the invention is to provide a revetment mold which is simple in construction, easy to manufacture and durable in use.

Briefly stated, in carrying out the invention, a casting platform is first constructed at some convenient location to provide a smooth working surface, and small angle-iron guide strips or bars are suitably fastened at spaced intervals transversely across the platform to serve as guides in spacing a plurality of mattress molds including members having beveled faces and at the same time to hold a reinforcing fabric at a proper height above the platform, with the angle guide bars supporting the reinforcing fabric in recesses formed in the members of the molds.

Concrete is then poured into the molds and, after tamping and screeding but before the concrete has set, the molds are pulled away from the concrete, thereby providing a flexible reinforced unit mat section of spaced concrete blocks or strips which are beveled at their opposite longitudinal edges to give the unit mat section sufficient flexibility as to permit the unit mat section to be rolled up and, after curing, may be transported to the site of ultimate use.

With the above and other objects and advantages in view, the invention consists of certain features of construction and operation of parts, which will hereinafter be described and shown in the accompanying drawings, in which:

Fig. 1 is a fragmentary top plan view of a molding apparatus including molds embodying the invention mounted in spaced transverse relation on a support, with a reinforcing fabric carried by angle guide bars used in spacing the molds on the support;

Fig. 2 is an enlarged longitudinal sectional view thereof, taken along line 2—2 of Fig. 1 and showing concrete poured onto the molding platform over the molding apparatus;

Fig. 3 is another enlarged longitudinal sectional view, taken along line 3—3 of Fig. 1, also showing the concrete poured onto the platform over the molding apparatus;

Fig. 4 is an enlarged transverse sectional view, taken on line 4—4 of Fig. 1.

Figure 5:
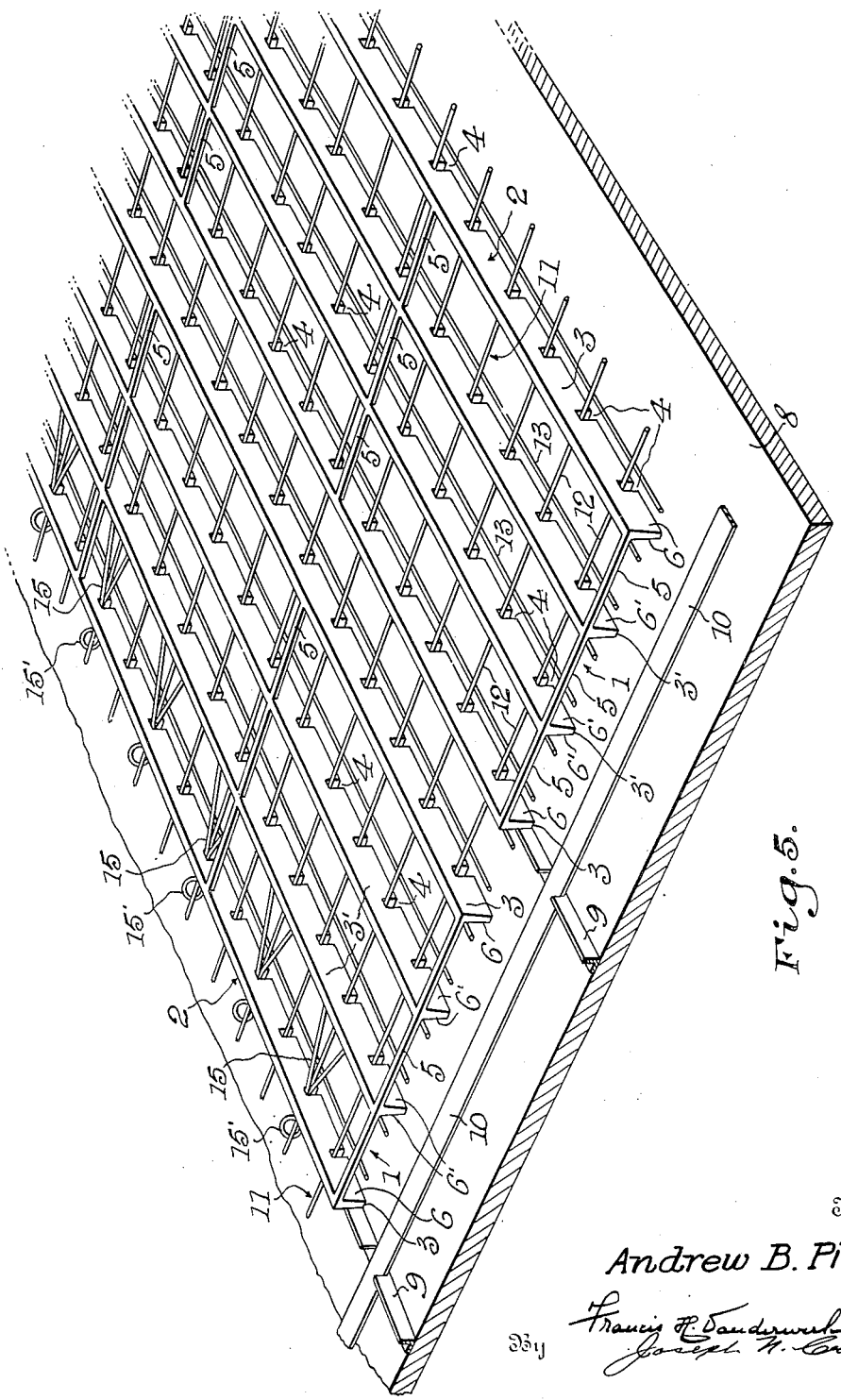
Fig. 5 is a fragmentary perspective view of the revetment molds mounted on a surface and showing the manner of transversely spacing the molds on the surface by means of the angle guide bars, with the reinforcing fabric supported in recesses formed in the bottoms of the molds.

Referring more specifically to the drawings the improved molds or forms 1, each comprises a rectangular shaped frame 2 preferably made of metal and having longitudinally extending side members 3 and intermediate longitudinally extending members 3' equally spaced from each other and arranged in parallel relation, with equally spaced recesses 4 formed in the bottoms of the members 3 and 3' for a purpose which will hereinafter be described. The side and intermediate members 3 and 3' respectively of the molds, are integrally joined together at their top portions by a plurality of equally spaced transverse webs or bars 5. The faces 6 of the longitudinal side members 3 of the molds are beveled downwardly for a purpose which will hereinafter appear.

To form a complete revetment mat section of concrete blocks 7, a longitudinally extending casting platform 8 is first constructed at some convenient location to provide a smooth working surface and then small angle-iron strips or bars 9 are fastened in spaced parallel relation transversely across the platform 8. Thin metal pulling straps 10 are then placed in spaced parallel relation with each other longitudinally of the platform and are provided for rolling up a completed unit mat section after being formed. A reinforcing material or fabric 11, consisting of longitudinal and transverse bonding wires 12 and 13, respectively, is next placed on the angle-iron bars 9 and pulled tight to take out any slack in the fabric. After the fabric 11 has been pulled tight the ends thereof are fastened to the platform 8 in any suitable manner such as by a transverse beam 14 nailed to the platform, Figs. 2 and 3. The ends of the reinforcing material 11 have wires 15 provided thereon, with exposed loops 15' provided on the wires 15 for connecting the unit mat sections together by means of wire strands (not shown) that are threaded through the loops 15' to form a complete revetment mat of any predetermined length.

The rectangularly shaped metal molds 1 are then laid transversely end to end across the platform 8 in spaced transverse parallel relation and secured thereto in any suitable manner, with a longitudinal side member 3 of the molds abutting or resting against the transversely extending angle guide bars 9, whereby the molds 1 are held in properly spaced transverse relation on the platform, with the molds being separated a distance equal to the space between the longitudinal side members 3 and intermediate members 3' of the molds. The longitudinal bonding wires 12 of the reinforcing material extend through the recesses 4 formed in the bottoms of the longitudinal side members 3 and intermediate members 3' of the molds and are supported in the recesses 4 by the angle guide bars 9.

After the molds 1 are transversely laid on the platform 8, with the longitudinal bonding wires 12 of the reinforcing fabric 11 supported in the recesses 4 on the bottoms of the longitudinal side and intermediate members 3 and 3', respectively, of the molds, concrete is then poured into the molds and, after tamping and screeding but before the concrete has set, the forms are removed or pulled out from the concrete. By beveling the faces 6 and 6' of the side and intermediate members 3 and 3' respectively of the molds in the manner described above, the opposite longitudinal edges of the transversely extending concrete blocks formed by the molds will be beveled to permit sufficient bending or flexure between the blocks as to be able to wind a completed unit revetment mat section up into a roll by means of the pulling straps 10. As many unit mat sections as desired may be formed and after being rolled up, the same may then be placed in a storage yard until cured from where they can be transported to the site of ultimate use and there connected together through the instrumentality of the wire loops 15' at the ends of the unit mat sections and a wire strand passed through the loop.

It will thus be seen that there has herein been provided a novel and efficient form of revetment mold, which is well adapted for the purpose intended. Even though there has herein been shown a revetment mold and apparatus for forming revetment mats as having certain features of construction, it is nevertheless to be understood that various changes may be made therein, if the changes do not depart from the spirit or scope of the claims.

Having thus described my invention, what I claim as new and wish to secure by Letters Patent is:

1. A mold assembly for casting articulated revetment mats for the protection of river banks against erosion, which comprises in combination, a casting platform having a smooth working surface, longitudinally extending side and intermediate members for the mold assembly disposed on the smooth working surface of the platform, the side and intermediate members having recesses formed in bottom portions thereof, and guide members for the side and intermediate mold members for transversely spacing the mold members on the smooth working surface of the casting platform, the said recesses in the side and intermediate members being adapted to receive a reinforcing fabric supported by the said guide members and said guide members adapted to hold a portion of the reinforcing fabric in the recesses on the side and intermediate members of the mold assembly.

2. Apparatus for casting revetment mats comprising, in combination, a casting platform, a partitioned mold assembly resting on said platform, the said mold assembly containing notched recesses in the lower portion thereof adapted to receive a reinforcing fabric, and multiple guide members affixed to the said casting platform for positioning the said mold assembly and adapted to support the wire reinforcing fabric in the notched recesses in the said mold assembly.

3. Apparatus for casting revetment mats comprising, in combination, a casting platform, a partitioned mold assembly resting on said platform, the said mold assembly containing notched recesses in the lower portion thereof adapted to receive wire reinforcing fabric, multiple guide members affixed to the said casting platform for positioning the said mold assembly and adapted to support reinforcing fabric in the notched recesses in the said mold assembly, and anchoring means mounted on the casting platform adapted to receive and retain the reinforcing fabric under tension during the pouring and setting of the concrete in the molds.

ANDREW B. PICKETT.

REFERENCES CITED

The following references are of record in the file of this patent:

UNITED STATES PATENTS

| Number | Name | Date |
|---|---|---|
| 1,025,508 | Caldwell | May 7, 1912 |
| 1,173,879 | Shearer | Feb. 29, 1916 |
| 1,173,880 | Shearer | Feb. 29, 1916 |
| 1,956,967 | Upson | May 1, 1934 |
| 2,390,403 | Van Der Rest | Dec. 4, 1945 |
| 2,394,228 | Barber et al. | Feb. 5, 1946 |